United States Patent
Brambilla

(10) Patent No.: US 6,187,236 B1
(45) Date of Patent: Feb. 13, 2001

(54) POLYETHYLENE MULTILAYER FILM

(75) Inventor: Giuseppe Brambilla, Novara (IT)

(73) Assignee: Pentacast S.r.l., Pozzilli (IT)

( * ) Notice: Under 35 U.S.C. 154(b), the term of this patent shall be extended for 0 days.

(21) Appl. No.: 08/757,720

(22) Filed: Nov. 27, 1996

(30) Foreign Application Priority Data

Dec. 6, 1995 (IT) .............................................. MI95A2560

(51) Int. Cl.$^7$ .................................................. B29C 47/88
(52) U.S. Cl. .............................. 264/173.15; 264/173.14; 264/173.19; 264/177.19
(58) Field of Search ..................... 264/173.15, 173.14, 264/173.19, 173.13, 177.19; 156/244.11

(56) References Cited

U.S. PATENT DOCUMENTS

| | | | |
|---|---|---|---|
| 3,547,891 | * 12/1970 | Snead et al. | 264/237 |
| 4,166,089 | * 8/1979 | De Geest et al. | 264/216 |
| 4,367,256 | * 1/1983 | Biel | 428/218 |
| 4,418,114 | * 11/1983 | Briggs et al. | 428/218 |
| 5,019,315 | * 5/1991 | Wilson | 264/173.19 |
| 5,108,844 | * 4/1992 | Blemberg et al. | 264/173.13 |
| 5,248,547 | * 9/1993 | Wilson | 428/218 |
| 5,261,536 | * 11/1993 | Wilson | 206/386 |
| 5,292,560 | * 3/1994 | German | 428/34.9 |
| 5,334,428 | * 8/1994 | Dobreski et al. | 156/244.11 |
| 5,399,426 | * 3/1995 | Koch et al. | 428/335 |
| 5,516,475 | * 5/1996 | Wilson | 264/173.14 |
| 5,595,050 | * 1/1997 | Koch et al. | 53/441 |

FOREIGN PATENT DOCUMENTS

| | | |
|---|---|---|
| 0 009 376 | 4/1980 | (EP) . |
| 0 139 089 | 5/1985 | (EP) . |
| 0 781 651 | 7/1997 | (EP) . |
| 03 026 707 | 2/1991 | (JP) . |

\* cited by examiner

*Primary Examiner*—Jan H. Silbaugh
*Assistant Examiner*—Mark Eashoo
(74) *Attorney, Agent, or Firm*—Guido Modiano; Albert Josif; Daniel O'Byrne

(57) ABSTRACT

Process for the preparation of a polyethylene multilayer film starting from linear low density polyethylene (LLDPE) by cast-extrusion, wherein the multilayer material coming out from a spreading head is collected on a first roller cooled with water maintained between 10° and 25° C. and the film coming out from the first cooling roller is sent to a second roller cooled with water maintained at a temperature lower than that of the first roller and the second roller has a peripheral velocity or speed of rotation 10–40% higher than that of the first roller. Multilayer film having a yield point and an ultimate elongation comprised within certain limits.

10 Claims, No Drawings

POLYETHYLENE MULTILAYER FILM

BACKGROUND OF THE INVENTION

The present invention relates to a multilayer film particularly adapted for the packaging of palletized units and to the method of preparation thereof.

In a prior Italian patent application, multilayer films have been disclosed, having high tenacity and good stretchability, obtained from linear low density polyethylene (LLDPE) blended with low density polyethylene (LDPE).

The preparation method disclosed in the prior application comprises the following steps:

- extrusion, from a battery of extruders, of LLDPE polyethylene blended with LDPE and at least a polymeric material having adhesion properties;
- stratification of the material at the exit of the extruders in function of the extruder it comes from;
- exit in atmosphere of the stratified material through the lip of a spreading head and deposition of it on a first cooling roller with high speed of rotation, cooled with water maintained between 10° and 30° C.;
- feeding the sheet exiting from the first roller to a second roller cooled with water at a temperature lower than that of the first roller and maintained between 100 and 20° C., the peripheral velocity of the second roller being 10–40% higher than the velocity of the first roller.

The slit of the spreading head, the distance between the lip of the head and the first roller and the lip and the point of contact on the first roller are comprised within well defined ranges.

The film thus obtained presents values of the yield point between 15 and 35 $N/mm^2$ and ultimate elongation between 200 and 500%.

SUMMARY OF THE INVENTION

It has now been unexpectedly found that it is possible to obtain multilayer films having characteristics of rigidity and stretchability comprised within those of the films disclosed in the prior Italian application and films also having new characteristics with respect to those of the film of the prior Italian application (more rigid but still stretchable) starting from LLDPE polyethylene without addition of LDPE polyethylene.

It has been furthermore found that by suitably regulating the cooling and stretching conditions of the film it is possible to obtain highly rigid but still stretchable films also starting from LLDPE mixed with a minor proportion of LDPE (in quantity from 8 to 40% by weight).

The process of preparation of the film is similar to that disclosed in the prior Italian application.

Some differences, however, are introduced for the preparation of very rigid films.

DESCRIPTION OF THE PREFERRED EMBODIMENTS

The preparation of the films is carried out by the well known cast-extrusion technique. This technique uses a battery of extruders (two or more), generally monoscrew extruders with screw of variable span to obtain good material homogenization, which extruders feed an apparatus (feed block) that, by means of a mechanical action, stratifies the material coming from the extruders in function of the extruder it comes from.

The sheet coming from the feed block is formed of several layers of which the central layer comes from the extruder of greater diameter and the side layers come from the other extruders.

The bar is then fed to a spreading head, wherefrom, by effect of a mechanical action, it is compelled to exit in the atmosphere through a slit of small opening thus forming a plastic film wherein the breadth prevails on the thickness.

The plastic film is deposited on a first cooled roller, rotating at high velocity, wherein the material is oriented. The film coming from this first roller feeds a second roller also cooled with water.

For the same throughput of the extruder and other conditions, the thickness of the film depends on the peripheral velocity of the first roller: actually, higher the velocity of this roller, lower the thickness of the film.

The film coming from the group of the cooling rollers is then collected on winding reels of adapted breadth and length.

The movement of the film on the winding reel is rendered uniform by constant tensioning of the film realized by a series of motorized rollers each of which presents positive relative rotation.

According to the process of the invention, LLDPE polyethylene and at least a polymeric material compatible with LLDPE and giving the film adhesion properties and, optionally other materials compatible with LLDPE, are extruded from a battery of extruders. The material coming out from the extruders is stratified in function of the extruder it comes from and the stratified sheet is forced to exit through the lip of a spreading head to form a plastic film which is deposited on a first roller rotating at high peripheral velocity (from 300 to 450 m/mn), and cooled with water maintained at a temperature from 10° to 25° C., and then on a second roller, cooled with water maintained at a temperature lower than that of the first roller and comprised between 10° and 20° C.

The second roller has a peripheral velocity 10–40% greater than the velocity of the first roller.

The temperature of the material coming from the spreading head is generally between 230° and 260° C.

The slit ranges between 0.3 and 0.5 mm; the distance between the lip of the spreading head and the first roller is between 2 and 5 mm, preferably 3–5 mm, and the distance between the lip and the contact point on the first roller is between 10 and 15 cm.

The slit is regulated in function of the final thickness of the film and the stretch to which the same may be subjected.

The distance between the lip of the spreading head and the point of contact of the material on the first roller is regulated both by approaching (distancing) the roller to the lip at the exit of the spreading head and by a pressure drop realized with an air aspiration device operating nearby the point of contact of the film on the cooling roller. The obtained pressure drop allows a good adherence of the film on the roller.

By changing the aspiration, the profile with which the material runs the distance from the lip of the spreading head to the cooling roller is changed, and simultaneously, the point of contact.

Greater the distance between the lip and the point of contact, higher the elastic performance of the material.

The operation is such as to avoid sliding of the film between the first and the second rollers.

This result is obtained for example, by subjecting the film to a counterpressure.

For the preparation of the film having a high yield point (between 40 and 80 N/mm$^2$) and a still high ultimate elongation (between 50 and 100%) one operates at a temperature of the cooling water of the first roller maintained in the range between 15° and 18° C., while the temperature of the cooling water of the second roller is maintained between 12° and 15° C. The peripheral velocity of the second roller is 20–30% higher than that of the first rollers.

The above-mentioned conditions are applied also to the preparation of the multilayer film having a high yield point (between 35 and 70 N/mm$^2$) and ultimate elongation between 60 and 200%, obtained from LLDPE polyethylene mixed with LDPE in quantities between 8 and 40% by weight.

With respect to the film obtained from LLDPE alone, the one obtained from LLDPE mixed with LDPE requires, the other conditions and yield point being equal, a greater difference between the velocities of the cooling rollers.

The thickness of the multilayer film according to the invention is between 2 and 100 micrometers; the preferred thickness ranges between 8 and 20 micrometers.

The LLDPE polyethylene used for the preparation of the film is a well known polymer. It is preparable by using either Ziegler-Natta catalysts or metallocene catalysts.

The LLDPE polyethylene can also be mixed with other polymeric materials in order to improve its processability. Said materials can comprise, for example, partially crystalline copolymers of propylene with minor proportions of butene and/or ethylene.

The LLDPE density is preferably comprised between 0.915 and 0.935 g/cm$^3$ (ASTM D 1505).

The melt index is preferably comprised between 2 and 3 g/10 (ASTM D 238-65T, E condition).

The LDPE is also a well known polymer. In order to confer the film adhesion properties, the LLDPE polyethylene is co-extruded with a layer of a polymeric material compatible with LLDPE, preferably selected among LLDPEs with a density between 0.895 and 0.910 g/cm$^3$.

For certain applications, film sliding properties are needed to avoid the adhesion between the platforms when the same are put in contact to each other.

The sliding capability which can be conferred to the inner or to the external side of the film preferably is obtained using LLDPE with density around 0.930 g/cm$^3$.

The film according to the invention comprises, therefore, a main layer, generally a central layer, a layer of a material with adhesion properties, and optionally a layer of LLDPE with density higher than that of LLDPE used for the main layer.

The polymers used for the preparation of the film can contain the additives normally used in this field such as pigments, antioxidants, nucleating agents. Also polymers compatible with LLDPE can be used in such a quantity which is adapted to improve the properties of LLDPE.

The film according to the invention is characterized by high rigidity and also by good stretchability.

With respect to a conventional LLDPE film obtained under the normal conditions of cast-extrusion, the film according to the invention presents yield point values which can arrive to values three times or more higher. The yield point values range between 15 and 80 N/mm$^2$.

The ultimate elongation is comprised in a range of practical interest which is between 50 and 500%.

LLDPE based multilayer films which are rigid and stretchable are known.

These films however are obtained by subjecting to stretch a film prepared by cast-extrusion.

The process for preparing these films is rather complex because it implies the unwinding of the film produced by cast-extrusion and its subsequent rewinding after stretching. To obtain high yield point values very high stretching ratios are used.

The films thus obtained have values of the yield point around 50 N/mm$^2$ and ultimate elongation around 60–70%.

The following examples are provided to illustrate but not to limit the scope of the invention.

EXAMPLE 1

A battery of monoscrew extrudes A–C with screws with variable span is fed, in this order, with LLDPE Dow 2100 (density 0.918 g/cm$^3$) (extruder A), with polyethylene Dow 4104 (density 0.904 g/cm$^3$) (extruder B) and with polyethylene LLDPE Dow 22376 (density 0.928 g/cm$^3$) (extruder C).

The mass throughput at the exit of the various extruders is respectively of 70%, 7% and 15%. The rotations of the screws of the A–C extruders are respectively 57,63 and 85 rpm and the temperature of the melt material at the exit of the extruders is respectively 265° C., 180° C., and 265° C.

The material exiting from the extruders is fed to a feed block device which stratifies the material for preparing it for the spreading head in function of the extruder it comes from.

The spreading head has a slit of 0.5 mm and the distance between the lip of the head and the point of contact with the first cooling roller is regulated at 15 mm. The temperature of the material exiting from the slit is 235° C.

The temperature of the water of the first winding roller is maintained at 18° C. The peripheral velocity is 340 m/min.

The temperature of the material exiting from the first roller is lower than 90° C. The material goes then to a second roller cooled with water maintained at 12° C. The velocity of the second roller is 430 m/min.

The film exiting from the cooling rollers is collected under constant tension on reels of given breadth and length.

The film has a thickness of 12 micron and presents the following mechanical characteristics.

|  |  | Machine direction | Transversal direction |
| --- | --- | --- | --- |
| Young's modulus (ASTM D 882-88) | N/mm$^2$ | 81 | 160 |
| Yield point (ASTM D 882-88) | N/mm$^2$ | 72 | 12 |
| Ultimate strength (ASTM D 882-88) | N/mm$^2$ | 72 | 28 |
| Ultimate elongation (ASTM D 882-88) | % | 88 | 480 |
| Tear resistance (ASTM D 1922-67) | mN | 150 | 300 |
| Impact resistance (ASTM D 1709-75) | g | 50 | 50 |
| Friction coefficient (ASTM D 1784-78) | g | 330 | 650 |

EXAMPLE 2

Example 1 is repeated with the difference that the extruder A is fed with LLDPE Dow 2100 (density 0.918 g/cm$^3$) and with LDPE polyethylene LD 150 of Dow with a throughput at the hopper of 8% by weight.

The obtained film has a yield point of 60 N/mm² and an ultimate elongation of 90% (machine direction).

COMPARATIVE EXAMPLE 1

Example 1 is repeated with the difference that the temperature of the cooling water of the first roller is maintained at 30°–35° C.; the temperature of the second roller is maintained at 28°–30° C. and the velocity difference between the first and the second rollers is 5%.

The mechanical characteristics of the film are the following.

|  |  | Machine direction | Transversal direction |
|---|---|---|---|
| Young's modulus (ASTM D 882-88) | N/mm² | 110 | 167 |
| Yield point (ASTM D 882-88) | N/mm² | 7.1 | 7.9 |
| Ultimate elongation (ASTM D 882-88) | % | 533 | 843 |
| Tear resistance (ASTM D 1922-67) | mN | 229 | 416 |
| Impact resistance (ASTM D 1709-75) | g | 180 | 180 |

What is claimed is:

1. A process for preparing a polyethylene multilayer film, having a yield point between 15 and 80 N/nm² and an ultimate elongation between 50 and 500% wherein a core layer comprises linear low density polyethylene, by cast extrusion, comprising the steps of:
   a) extruding the LLDPE having a density between 0.915 and 0.935 g/cm³ and at least a polymeric material having adhesion properties by a battery of extruders,
   b) stratifying the extruded material in function of the extruder it comes from,
   c) ejecting the stratified material into the atmosphere by forcing it through a lip of a spreading head,
   d) passing the stratified material exiting from the spreading head over a first cooling roller, wherein the first cooling roller is cooled with water and maintained between 10 and 25C, and
   e) conveying the stratified material exiting from the first cooling roller to a second cooling roller, wherein the second cooling roller is cooled with water to a temperature lower than that of the first cooling roller and maintained between 10° and 20° C., while the peripheral velocity of the second cooling roller is 10–40% higher than the first cooling roller, thereby forming the polyethylene multilayer film.

2. A process according to claim 1, wherein the temperature of the cooling water of the first cooling roller is maintained between 15° and 18° C. and the cooling water of the second cooling roller is maintained between 12° and 15° C. and the peripheral velocity of the second cooling roller is 20–30% higher than that of the first cooling roller.

3. A process according to claim 1, wherein the peripheral velocity of the first and second cooling rollers is between 300 and 450 m/min.

4. A process according to claim 1, wherein a distance between the lip of the spreading head and the first cooling roller is between 2 and 5 mm, and a distance between the lip and a point of contact of the extruded material on the first cooling roller is in the range between 10 and 15 mm.

5. A process according to claim 1, wherein a slit of the spreading head is between 0.3 and 0.5 mm.

6. A process according to claim 1, wherein the adhesive polymeric material is compatible with the LLDPE of the core layer and is linear low density polyethylene, LLDPE, having a density between 0.895 and 0.910 g/cm³.

7. A process according to claim 6, wherein the adhesive polymeric material is used in the amount between 5 and 15% of the weight of the LLDPE of the core layer.

8. A process for the preparation polyethylene multilayer film, wherein the central film comprises LLDPE mixed with low density polyethylene (LDPE), and the film has a yield point value between 35 and 70 N/mm² and an ultimate elongation between 60 and 200%, by cast extrusion according to the steps of the process of claim 1, wherein the temperature of the cooling water of the first cooling roller is maintained in the range between 15° and 18° C. and the cooling water of the second cooling roller, which is lower than that of the first cooling roller, is maintained between 12° and 15° C. and the peripheral velocity of the second cooling roller is 20–30% higher than that of the first cooling roller.

9. A process according claim 8, wherein the peripheral velocity of the first and second cooling rollers is between 300 and 450 m/min., a distance between the lip of the spreading head and the first cooling roller is between 2 and 5 mm and a distance between the lip and a point of contact of the extruded material on the first cooling roller is between 10 and 15 mm and a slit of the spreading head is between 0.3 and 0.5 mm.

10. A process according claim 8, wherein the adhesive polymeric material is linear low density polyethylene (LLDPE) having a density between 0.895 and 0.910g/cm³.

* * * * *